United States Patent
Bier et al.

(10) Patent No.: US 12,055,196 B2
(45) Date of Patent: Aug. 6, 2024

(54) POWER TRANSMISSION BELT WITH STRIPED SURFACE AND A STRIPED COVER FABRIC

(71) Applicant: GATES CORPORATION, Denver, CO (US)

(72) Inventors: Karla J. Bier, Columbia, MO (US); Lidia Garcia Saez, Barcelona (ES); David Tornero Garcia, Barcelona (ES); Vega Colom Martinez, Barcelona (ES); Jordi Graner, Manresa (ES); Brett Bertrand, Tecumseh (CA)

(73) Assignee: GATES CORPORATION, Denver, CO (US)

( * ) Notice: Subject to any disclaimer, the term of this patent is extended or adjusted under 35 U.S.C. 154(b) by 316 days.

(21) Appl. No.: 17/618,771

(22) PCT Filed: Jun. 12, 2020

(86) PCT No.: PCT/US2020/037633
§ 371 (c)(1),
(2) Date: Dec. 13, 2021

(87) PCT Pub. No.: WO2020/252410
PCT Pub. Date: Dec. 17, 2020

(65) Prior Publication Data
US 2022/0316553 A1     Oct. 6, 2022

(30) Foreign Application Priority Data
Jun. 13, 2019  (ES) .............................. ES 201930541

(51) Int. Cl.
*F16G 5/08*     (2006.01)
*F16G 5/20*     (2006.01)

(52) U.S. Cl.
CPC ................. *F16G 5/08* (2013.01); *F16G 5/20* (2013.01)

(58) Field of Classification Search
CPC ................. F16G 5/08; F16G 5/20; F16G 1/28
(Continued)

(56) References Cited

U.S. PATENT DOCUMENTS

| 3,190,137 A | 6/1965 | Adams, Jr. |
| 3,661,245 A | 5/1972 | Mol et al. |

(Continued)

FOREIGN PATENT DOCUMENTS

| DE | 102012101401 A1 | 8/2013 |
| EP | 1510726 A2 | 3/2005 |

(Continued)

OTHER PUBLICATIONS

European Patent Office, International Search Report International patent application No. PCT/US2020/037633, mailing date Sep. 16, 2020.

*Primary Examiner* — Michael R Mansen
*Assistant Examiner* — Mark K Buse
(74) *Attorney, Agent, or Firm* — Kevin J. Aiken, Esq.

(57) ABSTRACT

A cover fabric for power transmission belts having two or more alternating stripes or bands of different frictional properties. The stripes may be different fabric constructions. The fabric may be woven or knit with stripes of different area or yarn densities, different permeabilities, or different openness. The fabric may cover a surface of a V-ribbed-belt, V-belt, toothed belt, flat belt, round belt or other drive belt, resulting in stripes having different amounts of rubber strike through or different coefficients of friction. The stripes may be different rubber compositions or flocking or other materials.

14 Claims, 5 Drawing Sheets

(58) Field of Classification Search
USPC ........................................................ 474/264
See application file for complete search history.

(56) References Cited

U.S. PATENT DOCUMENTS

| | | | |
|---|---|---|---|
| 3,724,284 A | 4/1973 | Eng et al. | |
| 5,429,555 A | 7/1995 | Beckh | |
| 5,616,090 A * | 4/1997 | McGee, Jr. | D04B 9/44 |
| | | | 474/267 |
| 5,645,504 A * | 7/1997 | Westhoff | F16G 1/28 |
| | | | 474/271 |
| 6,561,937 B1 | 5/2003 | Wegele | |
| 6,572,505 B1 | 6/2003 | Knutson | |
| 7,749,120 B2 | 7/2010 | Pelton | |
| 9,322,455 B2 * | 4/2016 | Di Meco | F16G 1/28 |
| 9,334,122 B2 | 5/2016 | Shoji et al. | |
| 9,528,570 B2 * | 12/2016 | Baltes | F16G 1/10 |
| 9,709,128 B2 | 7/2017 | Fleck et al. | |
| 9,927,002 B2 * | 3/2018 | Kim | F16G 1/12 |
| 11,028,900 B2 * | 6/2021 | Bier | F16G 5/08 |
| 11,828,349 B2 * | 11/2023 | Bier | F16G 5/22 |
| 2003/0078125 A1 * | 4/2003 | Knutson | F16G 1/10 |
| | | | 474/263 |
| 2004/0063532 A1 * | 4/2004 | Nakamoto | F16G 5/20 |
| | | | 474/263 |
| 2008/0004145 A1 * | 1/2008 | Duke | F16G 1/28 |
| | | | 474/205 |
| 2008/0108466 A1 * | 5/2008 | Pelton | D04B 1/102 |
| | | | 474/267 |
| 2010/0035500 A1 | 2/2010 | Kimura et al. | |
| 2011/0269588 A1 * | 11/2011 | Fleck | F16G 1/10 |
| | | | 474/260 |
| 2012/0295748 A1 * | 11/2012 | Shiriike | F16G 5/20 |
| | | | 474/264 |
| 2013/0014690 A1 * | 1/2013 | Shirase | C09K 9/02 |
| | | | 116/207 |
| 2014/0238581 A1 * | 8/2014 | Brocke | F16G 1/10 |
| | | | 156/137 |
| 2015/0148165 A1 * | 5/2015 | Matsuda | F16G 1/21 |
| | | | 474/264 |
| 2015/0285334 A1 * | 10/2015 | Thomas | F16G 5/20 |
| | | | 474/90 |
| 2016/0010722 A1 * | 1/2016 | Kim | F16G 5/08 |
| | | | 474/271 |
| 2016/0053850 A1 * | 2/2016 | Brocke | F16G 1/10 |
| | | | 474/205 |
| 2017/0009847 A1 * | 1/2017 | Mitsutomi | D04B 21/20 |
| 2017/0030431 A1 * | 2/2017 | Duke, Jr. | F16G 1/04 |
| 2017/0284504 A1 * | 10/2017 | Mitsutomi | F16G 5/08 |
| 2017/0314641 A1 * | 11/2017 | Kamba | F16G 1/28 |
| 2018/0036975 A1 * | 2/2018 | Yoshida | F16G 1/28 |
| 2018/0187747 A1 * | 7/2018 | Yoshida | B32B 5/022 |

FOREIGN PATENT DOCUMENTS

| | | |
|---|---|---|
| JP | 2013213576 A | 10/2013 |
| WO | 0134988 A1 | 5/2001 |

* cited by examiner

POWER TRANSMISSION BELT WITH STRIPED SURFACE AND A STRIPED COVER FABRIC

BACKGROUND OF THE INVENTION

This invention relates generally to power transmission belts or drive belts such as V-belts and multi-V-ribbed belts with a new cover fabric, more particularly with a striped rib cover fabric, and specifically with a rib cover fabric with alternating stripes of greater and lesser density or permeability.

Multi-V-ribbed belts, or simply V-ribbed belts, also called serpentine and multi-groove belts, such as those belts sold under the trademark Micro-V® by Gates Corporation, are ubiquitous in automotive front end accessory drives, as well as many industrial drive applications. The belts transmit power by friction and are therefore susceptible to making noises under conditions causing slip. Some small degree of slip is unavoidable, for example from the belt moving into place as it enters a sheave, and from the belt adjusting from a high to low tension state, or vice versa, on a sheave. Examples of conditions causing much more slip and noise include insufficient belt tension, too high a load demand, wet conditions, misalignment of sheaves, cold temperatures, to name a few. Simply increasing the coefficient of friction ("COF") between the sheave and the belt ribs can increase the power transmission capability of the belt but can be counterproductive for noise by increasing the noise volume under misaligned conditions or when slip does occur. Belt designers must try to balance such competing demands as increased loads, extreme temperatures, both wet and dry conditions, with the desire for quiet belt drives. Ideally, the balance of properties should hold over the useful life of the belt. Similar concerns apply to other frictional drive belts, such as V-belts, flat belts, round belts, and the like, and even positive drive belts, such as toothed belts may require control of COF on a surface thereof.

Some methods of changing and controlling the COF of the belt surface involve placing fibers on the surface in the form of a fabric and then controlling the type and amount of rubber that is present at the surface. The rubber present at the surface may be a coating or layer that completely covers the surface, or rubber from the belt body or a rubber layer under the fabric may flow through the fabric to the surface during a molding step. This surface rubber resulting from flow through the fabric is called "strike-through." Often, COF increases with increasing strike-through. The rubber and the fabric may wear off during belt use resulting in undesirable changes in noise or frictional behavior.

There have been various prior efforts to control strike-through in order to control COF. E.g., U.S. Pat. No. 9,709,128 to ContiTech and U.S. Pat. No. 9,341,233 to Gates describe efforts to control strike-through in order to control COF. U.S. Pat. No. 7,749,120 describes efforts to minimize strike-through on a toothed power transmission belt.

SUMMARY OF THE INVENTION

The present invention is directed to systems and methods which provide V-ribbed belts or other power transmission belts with controlled COF, wherein the belt has a good balance of relatively high and stable wet COF and dry COF, leading to good load capacity with low levels of noise emission across a range of environmental conditions. The invention is directed to belts with at least one surface having alternating regions or stripes. By "striped" is meant there are alternating long narrow bands or elongated regions having identifiable differences. The stripes need not be visually obvious in the belt, since they may be hidden by dyes, coatings, rubber strike-through, or other dominant effects. The stripes may be alternating regions of different COF characteristics. The alternating stripes may have relatively higher and lower COF, thus defining an intermediate, average COF for that surface.

In one embodiment, the invention is directed to a striped rib cover fabric and a power transmission belt with the fabric applied to a surface thereof. The stripes may be alternating regions of greater and lesser permeability, or density (e.g., yarn density), or porosity. The stripes may be alternating regions of different weaves or knit constructions which may result in different fabric stretch characteristics, different permeability, or other property differences. In the belt, the striped fabric may result in visually different alternating regions on a belt surface. In some embodiments the stripes may be alternating regions of higher and lower COF. The stripes may be alternating regions of more and less rubber strike through from the belt body to the surface thru the fabric, which may be a result of a difference in permeability or openness of weave, and which may lead to differences in COF. The stripes may include one or more of the aforementioned features or effects. The stripes may run transversely across the width of the belt, longitudinally along the length of the belt, or at an angle with respect to the belt length or width. The power transmission belt may be a V-ribbed belt, a V-belt, a flat belt, a toothed belt, a round belt, or the like. The striped fabric may be on the contact or working surface of the belt, such as the ribs of a V-ribbed belt or the angled sides of a V-belt, or the teeth of a synchronous belt, or on the back side of the belt, or on all sides of the belt.

In a second embodiment the stripes are different material compositions having different frictional characteristics.

In a third embodiment the stripes are different surface treatments, such as a flocked surface alternating with a rubbery surface.

The invention is also directed to the striped fabric for use as a cover fabric on a power transmission belt.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
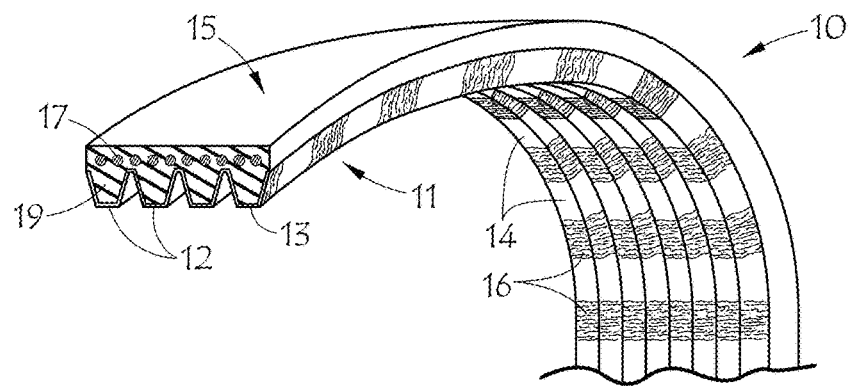
FIG. 1 is a partially fragmented perspective view of a V-ribbed belt with striped rib surface according to an embodiment of the invention.

The invention is directed to a power transmission drive belt having a striped surface thereof. By "striped" is meant there are alternating bands or elongated regions having identifiable functional differences. The stripes need not be visually obvious in the belt, since they may be hidden by dyes, coatings, rubber strike-through, or other dominant effects. The stripes may be alternating regions of greater and lesser coefficient of friction (COF). The stripes may result from a surface cover fabric which may have alternating regions of different weaves or knits which may result in different stretch characteristics, different permeability, different density (e.g. yarn density), porosity, or other functional property differences. In the belt, the striped fabric may or may not result in visually different alternating regions on a belt surface. Preferably, the stripes are alternating regions of higher and lower COF. The stripes may be alternating regions of more and less rubber strike through from the belt body to the surface thru the fabric, which may be a result of a difference in permeability, density, or openness of weave. The stripes may be different material (e.g. rubber) compositions or alternating regions of flock and rubber. The stripes may include one or more of the aforementioned features or effects. The stripes may run transversely across the width of the belt, or across the width of the belt at an angle, or parallel to the longitudinal axis of the belt. The stripes may be on the ribs, teeth, sides or on the back side of a belt.

The stripes of the inventive cover fabric do not include effects that merely resemble stripes but do not impart functional differences in permeability, rubber strike-through, yarn density, COF, or the like. For example, simple rib knits, whether 1×1, 2×2, 3×3, or the like, produce alternating rib patterns that still have the same basic knit pattern, just reversed. Thus, the alternating ribs in rib knits do not have different values of permeability, density, or tendency for strike-through. Therefore, simple rib knits are not included in the definition of striped fabrics herein. Likewise, simply making differently colored stripes on otherwise uniform fabric is not included in the definition of stripes herein. Woven fabrics that alternate regions of different weaves that have the same density or permeability are also not included in the definition of striped.

The stripes may be characterized by their widths and densities, either as made, or as installed on a belt. It should be understood that the installed density is often significantly less than the as-made density because the fabric may be stretched either to apply to a belt mold or during molding to conform to a belt surface profile, or both. The stripes may also be characterized by the resulting COFs after applying to a belt surface or molding. Another way to characterize the stripes is by the degree of rubber strike-through penetrating a striped fabric using a visual rating.

The power transmission belt may be a V-ribbed belt, a V-belt, a flat belt, a toothed belt, a round belt, or the like. The stripes or striped fabric may be on the contact or working surface of the belt, such as the ribs of a V-ribbed belt or the angled sides of a V-belt, or the teeth of a synchronous belt, or on the back side of the belt, or on all sides of the belt. The belt is preferably a frictional drive belt and the fabric is on a pulley contact surface. The belt is preferably a V-ribbed belt and the striped fabric is preferably on the ribs.

FIG. 1 shows V-ribbed belt 10 with striped rib cover fabric 13 on ribs 12, making a striped wear surface 11. V-ribbed belt 10 also has tensile cords 17 embedded in belt body 19. Back side 15 may optionally include a fabric, which may be a striped fabric. Light stripes 14 represent stripes of one type and dark stripes 16 represent stripes of another type. Light stripes 14 may be, for example, fabric stripes of higher yarn density, lower permeability, or lesser strike through of rubber. Dark stripes 16 may be, for example, fabric stripes of lower yarn density, higher permeability, or greater strike through of rubber. Thus light stripes 14 may indicate lower COF than dark stripes 16 or vice versa.

The invention is also directed to other types of belts having a cover fabric on a surface of the belt. Other types of belts include without limit round belts, flat belts, V-belts, and toothed belts. The belts may be banded, i.e., completely covered with the striped cover fabric on all sides, as in banded V-belts or round belts. The belts may be covered on one or more sides. Multiple layers of cover fabric may be used on the whole belt or on one or more sides of the belt. The stripes may be placed at any angle, including parallel or perpendicular to the belt longitudinal axis.

Figure 2:
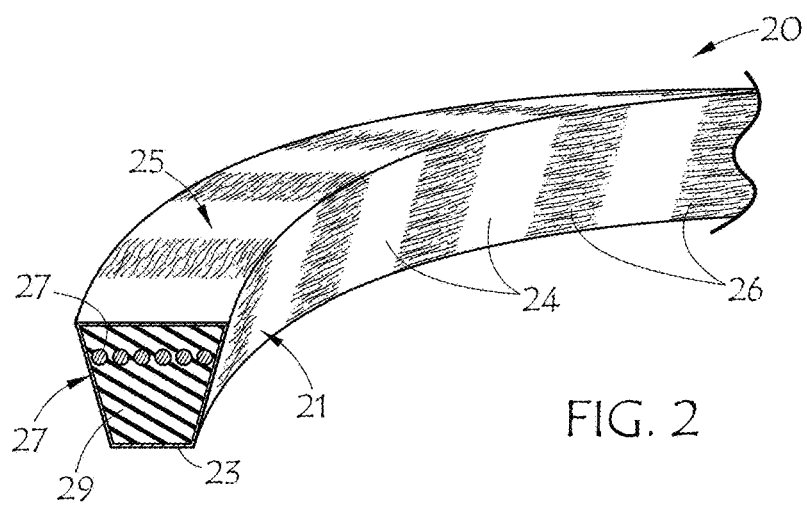
FIG. 2 is a partially fragmented perspective view of a banded V-belt with striped cover fabric according to an embodiment of the invention.

FIG. 2 shows banded V-belt 20 with striped band ply fabric 23 covering the entire belt surfaces, including the angled, pulley-contacting, side surfaces 21, the back of the belt back side 25, and the side opposite back side 25. V-belt 20 also has tensile cords 27 embedded in belt body 29. Light stripes 24 represent stripes of one type and dark stripes 26 represent stripes of another type. Light stripes 14 may be, for example, fabric stripes of higher yarn density, lower permeability, or lesser strike through of rubber. Dark stripes 26 may be, for example, fabric stripes of lower yarn density, higher permeability, or greater strike through of rubber. Thus light stripes 24 may indicate lower COF than dark stripes 26.

Figure 3:
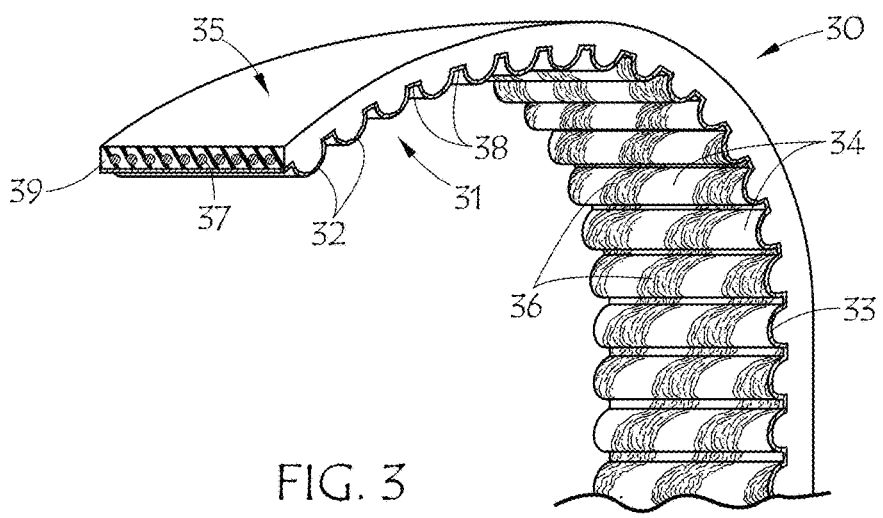
FIG. 3 is a partially fragmented perspective view of a toothed belt with striped tooth fabric according to an embodiment of the invention.

FIG. 3 shows toothed belt 30 with striped tooth cover fabric 33 on the toothed side of the belt, which has teeth 32 alternating with lands 38. Toothed belt 30 also has tensile cords 37 embedded in belt body 39. Back side 35 may optionally include a fabric, which may be a striped fabric. Light stripes 34 represent stripes of one type and dark stripes 36 represent stripes of another type or characteristic. Light stripes 34 may be, for example, stripes of higher yarn density, lower permeability, or lesser strike through of rubber. Dark stripes 36 may be, for example, stripes of lower yarn density, higher permeability, or greater strike through of rubber. Thus light stripes 14 may indicate lower COF than dark stripes 16.

Figure 4:
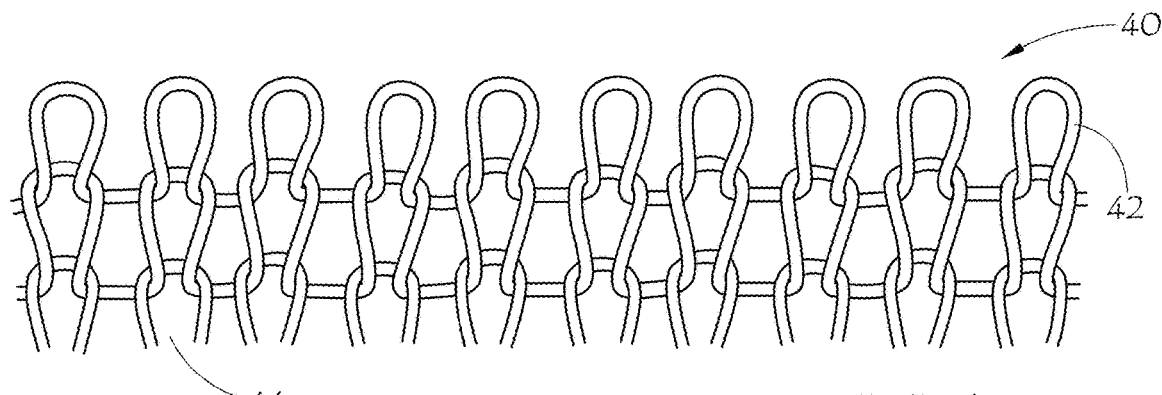
FIG. 4 is a representation of a conventional plain knit fabric.
Figure 5:
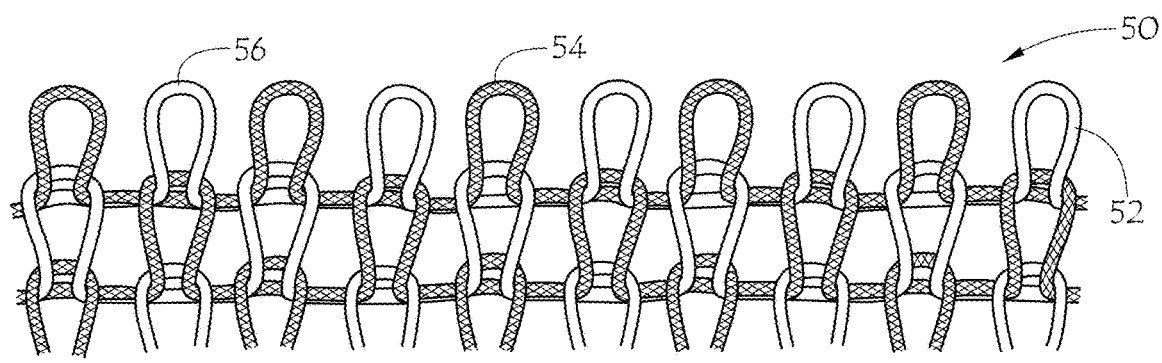
FIG. 5 is a representation of a conventional 1×1 plain knit fabric.
Figure 6:
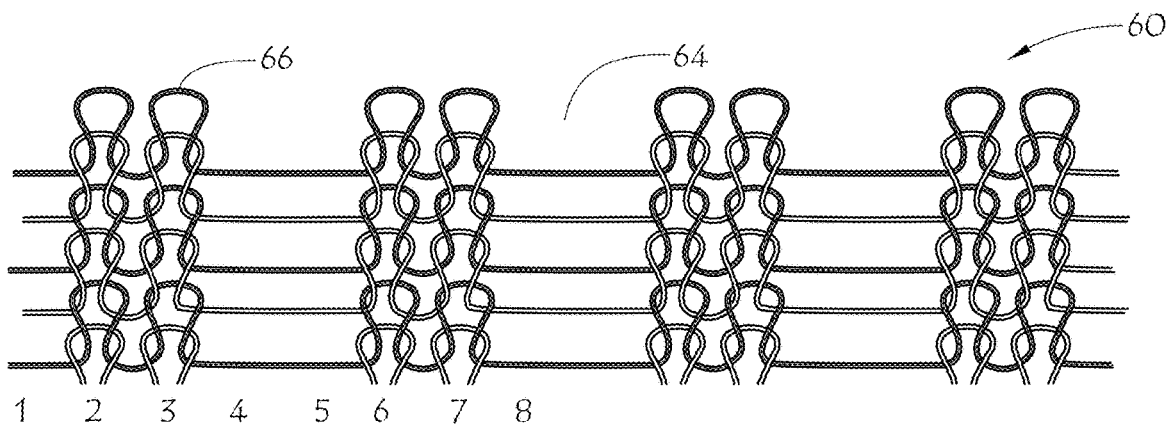
FIG. 6 is a representation of a striped knit fabric with plain knit stripes and dropped-stitch stripes according to the invention.

In one embodiment of the invention, the fabric is knit and the stripes are the result of dropping stiches in a regular way. FIG. 4 shows a basic knit fabric 40, which does not contain stripes. This is a plain weft knit pattern, or single jersey knit, with continuous yarns running horizontally forming the courses 42, and the loops pulled vertically to form wales 44. FIG. 5 shows another basic knit pattern without stripes, 1 by 1 jersey knit 50, wherein each course 52 is formed by two yarns 54 and 56 which alternate, forming every other loop in both the courses and the wales. The presence of the two yarns makes the 1×1 knit of FIG. 5 a little higher density than the plain knit of FIG. 4 and also more resistant to unraveling. FIG. 6 shows a striped knit wherein the plain knit pattern of FIG. 4 is altered to form lower density stripes by dropping stitches. Thus in FIG. 6, striped knit 60 has higher density stripes 66 alternating with lower density stripes 64. Clearly the dropped stitch sections result in larger pores, lower yarn density, and higher permeability than in the plain knit sections. The numbers 1 through 8 in FIG. 6 represent knitting needles which could be used to make the striped fabric 60. Needles 2, 3, 6, and 7 are active and produce the plain knit stripes 66, while needles 1, 4, 5, and 8 are inactive resulting in the dropped-stitch stripes 64. The dropped stitches may also be called float stitches.

Figure 7:
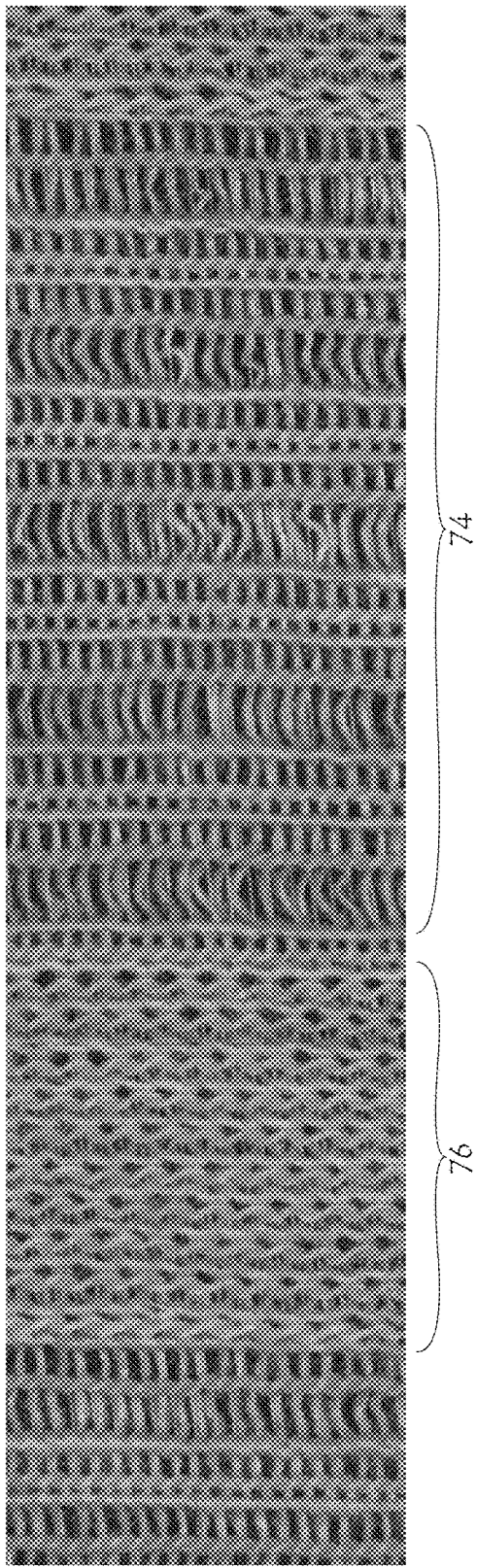
FIG. 7 is a photograph of a portion of another striped knit fabric with plain knit stripes and dropped-stitch stripes according to the invention.

FIG. 7 shows a striped knit 70 wherein the 1×1 knit pattern of FIG. 5 forms high density stripe 76, but the pattern is altered to form lower density stripe 74 by dropping stitches. Ten wales form high density stripe 76. Low density stripe 74 is made up of five repeats of the pattern shown in FIG. 6, namely two plain wales followed by two dropped stitch wales repeated five times. This pattern may give a striped pattern of nominal dimensions of about 5 mm for the dense stripes and about 10 mm for the more open stripes, depending of course on the yarn size, tightness of knit, and shrinkage or stretch before measuring. Clearly the dropped stitches result in larger pores, much lower yarn density, and higher permeability than in the plain knit sections. The width of the stripes is easily varied by making more or fewer wales in each type of stripe. The widths of the stripes in a knit may thus be controlled during knitting by the number of needles active in each section and the number of dropped stitches or inactive needles.

Figure 8:
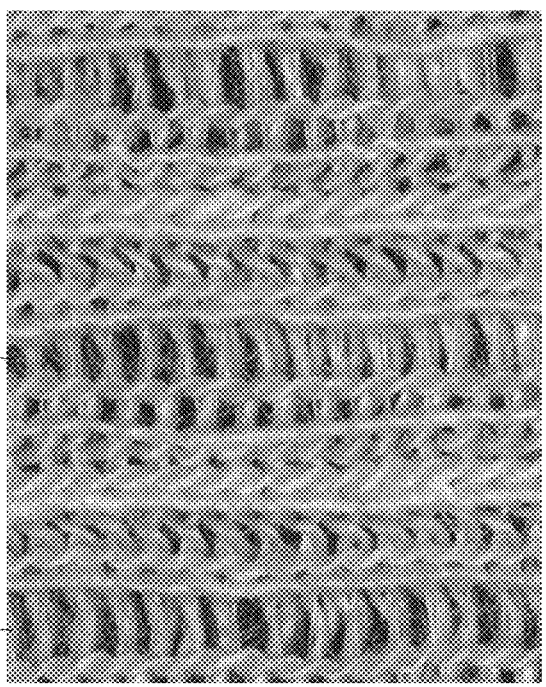
FIG. 8 is a photograph of a portion of another striped knit fabric with piqué knit stripes and dropped-stitch stripes according to the invention.

FIG. 8 shows another striped knit fabric according to an embodiment of the invention based on a piqué knit pattern interrupted with wales of floats or dropped stitches. In FIG. 8, striped knit 80 has high-density stripes 86 based on the piqué knit pattern, 3-wales wide in this case. The piqué knit portions involves alternating plain loops and tuck stitches. The low-density stripes 84 are again a two-wale width of dropped stitches (or float stitches). In terms of needles, the repeat pattern is 3 needles doing piqué knit next to two inactive needles for the float stitches, repeated as many times as needed. Again, the widths of the stripes can be varied by varying the number of needles (or wales) doing the piqué knitting and the number of needles in the float sections.

In general, any high density knit pattern could be used for the denser stripes, with float stitches or dropped stitches for the less dense stripes. Alternately, the less dense stripes could simply be an alternate lower density knit pattern than the denser stripes, for example with more or longer tuck stitches to open up larger pores in the knit structure. The knit may be produced in flat form (flat knit) or in tubular form (circular knit).

According to another embodiment, the fabric may be woven in a way that includes stripes or regions of different yarn density or openness, analogous to the knit embodiments, but woven with warp and weft yarns. A fabric weave diagram can illustrate such weave patterns. In the weave diagrams shown herein, as is customary in the art, the squares represent yarn crossings between warp and weft. A line segment inside the square indicates whether the top, or visible, yarn at the crossing is a warp or weft yarn. Vertical line segments indicate the warp yarn is visible or on top of the weft. Horizontal line segments indicate the weft is on top of the warp. Unbroken lines, extending across two or more boxes indicate the lack of a crossing due to the absence of a warp or weft. Empty boxes indicate neither warp nor weft are present. As is conventional, the warp yarns run upward (vertically) in the diagram, and the weft yarns from side to side (horizontally). It should be understood that for use in a belt, either the warp or the weft could be oriented in the longitudinal direction of the belt, or the warp and weft could be placed at an angle (i.e., on a bias, or at a bias angle) on the belt. The warp and weft could be perpendicular, or they could be shifted to a desired non-right angle using methods known in the art.

Figure 9:
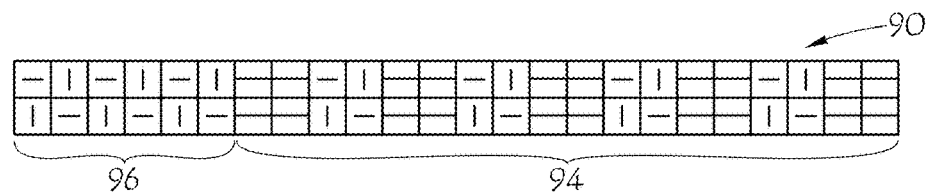
FIG. 9 is a weave schematic of a woven striped fabric according to the invention.

FIG. 9 is a weave schematic of a woven striped fabric according to the invention. In FIG. 9, fabric 90 includes low-density stripes 94 and high-density stripes 96. The high density stripes are plain woven. The low-density stripes 94 are produced by omitting a number of warp yarns and floating the weft yarns (also known as picks or fill yarns) across the gaps between high-density stripes 96. Again, the widths of the stripes can be varied by varying the number of warps in plain woven sections (i.e., the ends per inch or "epi," or picks per inch, "ppi") and the number of missing warps in the float sections. In this case, the low-density stripes 94 are much wider than the high-density stripes 96. Therefore, the low density stripes are not one continuous float, but include periodic pairs of warp yarns in order to maintain the integrity of the fabric in the float sections. Nevertheless, the overall yarn density in the more open stripes 94 is less than in the more tightly woven stripes 96.

Figure 10:
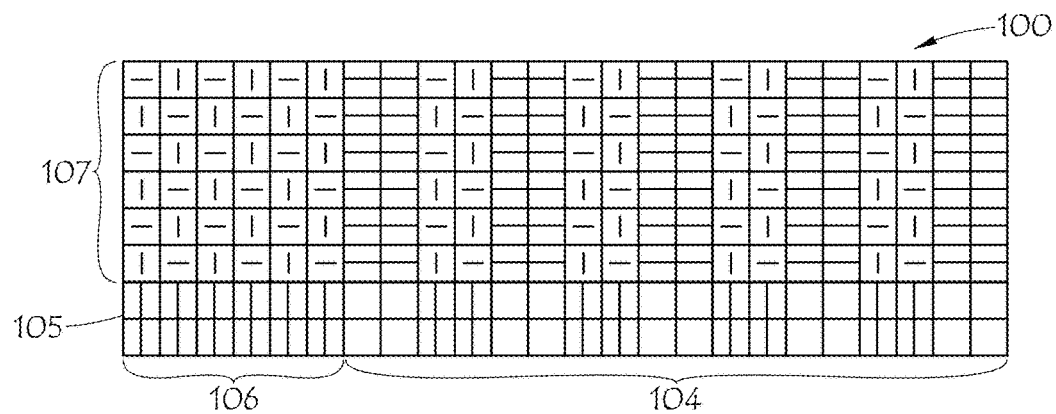
FIG. 10 is a weave schematic of another woven striped fabric according to the invention.

FIG. 10 is a weave schematic of another woven striped fabric according to the invention. In FIG. 10, fabric 100 includes low-density stripes 104 and high-density stripes 106 as in FIG. 9. The high density stripes are plain woven. The low-density stripes 104 are again produced by omitting a number of warp yarns and floating the weft yarns. Again, the widths of the stripes can be varied by varying the warp epi in the plain woven sections and the number of missing warps in the float sections. FIG. 10 also includes horizontal stripes made up of regular sections 107 with the same pattern as FIG. 9, and low density horizontal stripes 105 produced by skipping a couple weft yarns and floating the warps across the resulting gaps. This pattern also results in larger pores where the horizontal and vertical low-density stripes intersect, where neither weft nor warp are present. Thus, plaid or checkered patterns (i.e. fabrics with stripes running both directions) may be included in the definition of "striped" herein.

Figure 11:
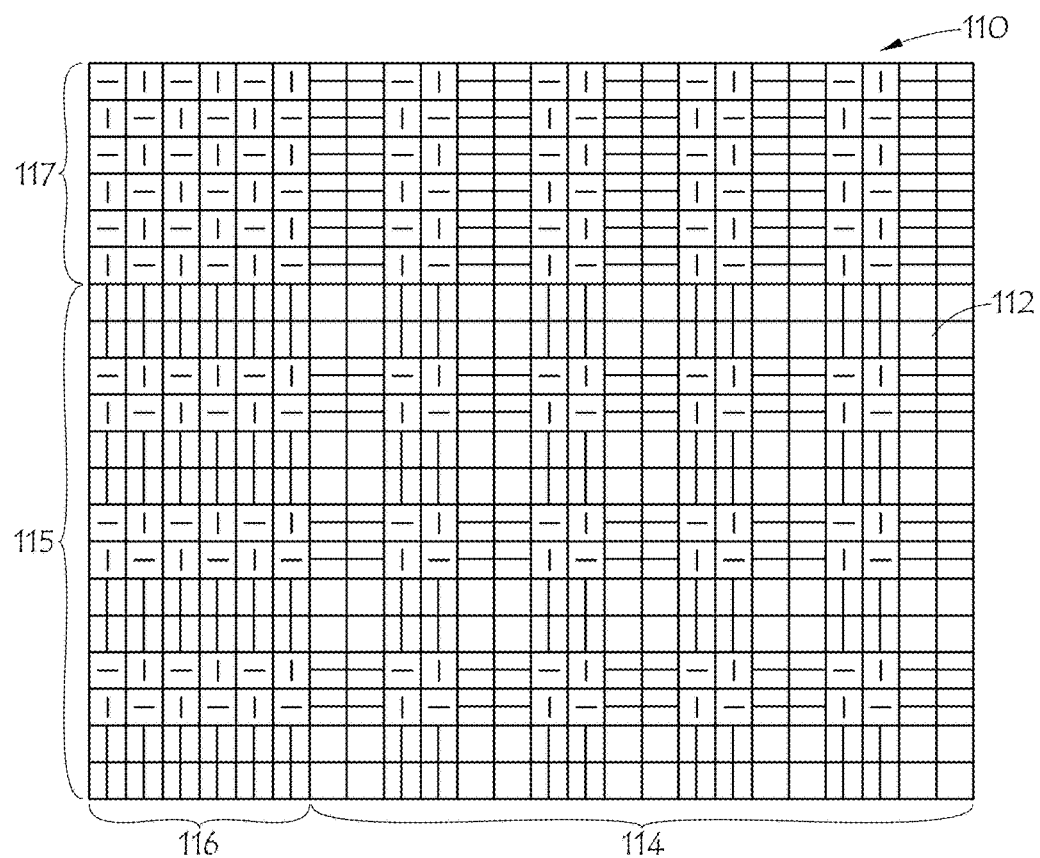
FIG. 11 is a weave schematic of another woven striped fabric according to the invention.

FIG. 11 is a weave schematic of yet another woven striped fabric according to the invention. In FIG. 11, fabric 110 includes stripes in both directions with the low-density horizontal stripes 115 made wider and interspersed with occasional weft yarns like the low density vertical stripes 114 (and like section 94 in FIG. 9). The combination of both horizontal and vertical stripes results in four different regions in fabric 110. The intersections of the horizontal higher density stripes 117 and the vertical higher density stripes 116 result in the highest density regions. The intersections of the horizontal lower density stripes 115 and the vertical lower density stripes 114 result in the lowest density regions with largest pores 112 where there are no warp or weft threads. The intersections of the horizontal higher density stripes 117 and the vertical lower density stripes 114 result in the intermediate density regions with vertical stripes. The intersections of the horizontal lower density stripes 115 and the vertical higher density stripes 116 result in the intermediate density regions with horizontal stripes. Again, the relative lengths and widths of the regions can be varied by varying the warp and weft epi in the denser woven sections and the number of missing warps and wefts in the float sections. Thus, many varieties of plaid or checkered patterns (i.e. fabrics with stripes running both directions) may be included in the definition of "striped" herein.

Thus, the striped fabrics of the invention include alternating regions of different density, permeability or openness, especially to the rubber that is placed just under the fabric which may be prone to flow during curing of the belt under pressure. The different amounts of openness may be obtained by varying the style or structure of weaving or knitting in the different regions. For example in a knit fabric a low permeability stripe may be obtained by a plain knit construction and a higher permeability stripe may be obtained by altering the knit construction, for example, to include tuck stitches (tucks) or float stitches (floats) or by dropping stitches. In a woven fabric, based on a conventional weave, whether plain square weave or twill or other regular weave, higher permeability strips may be obtained by dropping or omitting certain warp and/or weft yarns.

U.S. Pat. Pub. No. 2010/0167860 A1 and U.S. Pat. Pub. No. 2010/0173740 A1, the entire contents of which are hereby incorporated herein by reference describes useful materials and methods for fabrics and V-ribbed belts according to the present invention. For a V-ribbed belt including a rib surface covered with fabric, the fabric is preferably stretchable in two predetermined directions. The fabric materials may be selected to provide sufficient stretchability. Furthermore, the material may be selected so as to afford sufficient durability to the belt in consideration of the performance required of the wear surface (e.g., in terms of wear resistance, heat resistance, stability of friction coefficient, water resistance, and slip and noise properties).

For example, the material of the fabric may include an elastic yarn or fiber including polyurethane and at least one type of non-elastic yarn or fiber including cellulose- or non-cellulose-based yarn or fiber, or a blend thereof. The blend of cellulose-based yarn or fiber and the non-cellulose-based yarn or fiber is made either by blending two types of fibers in a spun or twisted or wrapped yarn or by feeding together different types of yarns during the fabric manufacturing process, whether by knitting or weaving. The elastic yarns help retain the needed degree of stretch, which might be otherwise reduced by introducing floats or other knit or weave modifications.

The cellulose-based yarn or fiber may include: natural fiber such as cotton, linen, jute, hemp, flax, abaca, and bamboo; man-made fiber such as rayon and acetate; and combinations thereof. Cotton is a preferred cellulose-based yarn.

Non-cellulose-based yarn or fiber includes polyamide, polyester, polyethylene naphthalate, acrylic, aramid, polyolefin, polyvinyl alcohol, liquid crystal polyester, polyetheretherketone, polyimides, polyketone, PTFE, e-PTFE, PPS, PBO, wool, silk and combinations thereof.

For improved wet performance, the fabric may include a two-yarn construction including a first yarn which is elastic such as polyurethane, and a second yarn of cellulose such as cotton. Furthermore, a three or more yarn construction including an elastic yarn or fiber, a cellulose yarn or fiber, and other yarns, may be used. A third yarn may be selected according to the desired wear resistance.

Preferably, the first yarn is an elastic yarn such as polyurethane, which provides the fabric with a high level of stretchability. The second and third yarn or fibers could consist of a blend of two different types of yarn or fibers, which may be combinations of cellulose yarn or fiber and non-cellulose yarn or fiber, blended in different ratios. One type is non-cellulose yarn or fiber, which provides the wear resistance or durability. The other type is cellulose yarn or fibers, which will provide superior wet performance. In some applications the cellulose yarn or fiber alone can provide adequate durability and wet performance.

The blend ratio of cellulose-based yarn or fiber and non-cellulose-based yarn or fiber may range from 100:0 to 0:100. A ratio of cellulose-based yarn or fiber from 5% to 100% and non-cellulose-based yarn or fiber from 0% to 95% is preferable. Furthermore, the ratio of the elastic yarn or fiber to the non-elastic yarn or fiber may be from 2% to 40%.

A method for manufacturing a V-ribbed belt may include placing a belt matrix (including belt body materials and tensile cord) about a mandrel, placing the inventive fabric about the external circumference of the belt matrix, which wraps around the mandrel, placing the mandrel inside a shell having a plurality of grooves on the internal circumference, expanding the belt matrix and the fabric toward the internal circumference of the shell, and thus pressing the fabric against the internal circumference with the multi-ribbed structure, and curing the belt matrix with the fabric. The fabric stretches to accommodate itself to the multi-ribbed structure and to the expanded circumference.

Any known method may be used to manufacture the various types of belts using the striped fabrics of the invention. The belt manufacturing methods in which the striped fabrics may be used are not limited.

A 3D FEA (three-dimensional finite element analytic) model was created to investigate theoretically the effect of stripes of different COF on belt noise. The FEA model was simplified to model one rib of a belt as it slides radially into a pulley groove under a misaligned condition. The model reproduced a stick-slip phenomenon and calculated the strain energy stored before the "stick" released and the rib "slipped" down into the groove. The high-energy state just before slip could be associated with noise—the higher the energy, the more noise could be released at slip. The model was run for different stripe widths and the strain energy at slip was compared with equivalent non-striped models of the same average COF. The model results are shown in TABLE 1. The units of strain energy are N-mm, but the strain-energy in TABLE 1 may be considered as relative rankings since the scale of the model is not that of an actual belt. The results indicate that stripes with two different friction coefficients have the potential to significantly reduce noise-causing strain-energy release in a frictional belt drive relative to a non-striped surface with the same average COF. The width of the stripes seems to have very little effect on the amount of improvement potential. The narrower stripes seem to be directionally better than wider stripes, but the differences are not that great. Thus, the 1-mm stripes have the greatest % reduction in strain energy, followed by the 2-mm stripes, but the 3-mm stripes and the 10-mm stripes are comparable to each other.

The invention was also demonstrated on actual belts subject to COF testing and misalignment noise (MAN) testing.

Figure 12:
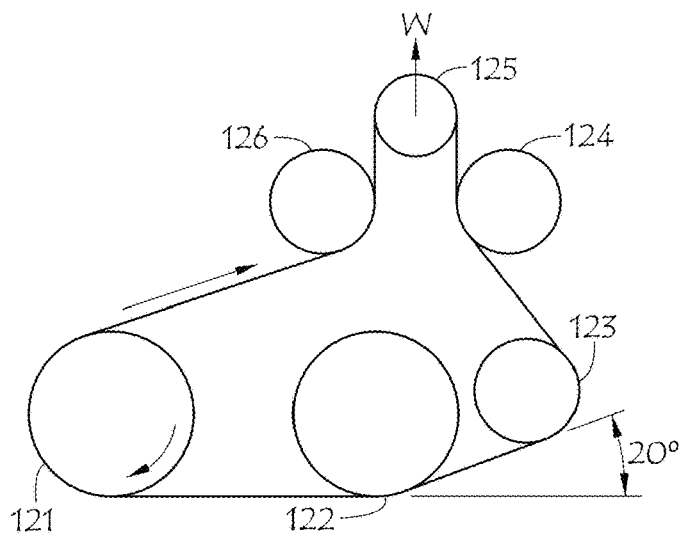
FIG. 12 depicts a coefficient of friction (COF) test pulley configuration.

The COF test was conducted in accordance with SAE J2432-MAR2015 § 10, on a layout as shown in FIG. 12. Referring to FIG. 12, driven test pulley 122 and driver pulley 121 both have a multi-v-rib profile and diameter of 121.6 mm. Pulleys 123, 124, and 126 are idlers. Pulleys are positioned to maintain a 20-degree wrap angle on driven pulley 122. Driver pulley 121 is turned at 400 rpm. Weight W of 360 N is applied to pulley 125 to provide a slack side belt tension of 180 N at pulley 125. Torque is applied to test pulley 122, ramping up from zero torque until the pulley stops turning. The COF is calculated from the maximum torque observed. It should be understood, the test measures an effective coefficient of friction on the belt, which does not numerically match the theoretical friction coefficients used in the FEA modeling above. Wet COF testing is done by spraying water at 300 ml/min. onto the belt between pulleys 121 and 122, increasing the wrap angle to 45° on driven pulley 122, and turning driver pulley 121 at 800 rpm.

Figure 13:
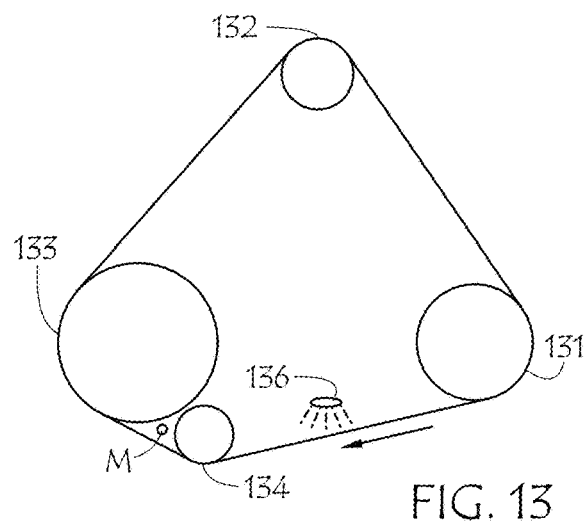
FIG. 13 depicts a misalignment noise (MAN) test pulley configuration.

The misalignment noise (MAN) test was conducted in accordance with SAE J2432-MAR2015 § 9, on a four-point drive as shown schematically in FIG. 13. Referring to FIG. 13, pulleys 131, 132, and 133 have multi-v-rib profiles and diameters of 101 mm, 61 mm, and 140 mm, respectively. Pulley 131 is the driver, turning at 1000 rpm clockwise. Pulley 134 is an idler with diameter of 50 mm. Pulley 133 can be displaced perpendicular to the plane of the layout, producing a misalignment angle. A tension of approximately 267 N was applied to the test belt by means of dead weight on tension pulley 132. Then pulley 133 was offset by a certain amount and the noise measured by microphone M. The MAN test at 90% humidity includes a water mist nozzle 136. The belts were tested new and after conditioning in accordance with SAE J2432-MAR2015. The noise results are reported in decibel units (dB). The background noise measured with a quiet belt is in the range of 79-82 dB. Belts testing above about 85 dB are quite noisy.

A series of three V-ribbed belts were constructed to illustrate the advantages of striped belts of the invention over conventional belts with uniform friction surfaces. The belt constructions only differed in the fabric covering the ribs. Comparative ("Comp.") Belts A and B had a standard 1×1 jersey knit, rib cover as illustrated in FIG. 5. For Belt A, the fabric was applied to the mold with relatively little stretch, corresponding to a standard, relatively high yarn density, resulting in a rib surface mostly of fiber giving a relatively low dry COF of 0.73, and low noise generation on two of the most severe test conditions for misalignment noise (2° pulley misalignment at low temperatures and at high humidity). Although Belt A runs quietly, there are applications requiring a higher COF.

For Comp. Belt B, the fabric was applied to the mold with a somewhat higher stretch level corresponding to about 30% lower yarn density, resulting in more rubber strikethrough to the rib surface and a higher dry COF of 1.59 as desired for some applications. However, Belt B ran very noisy at both misalignment test conditions. Note that the wet COF is lower than for Comp. Belt A, which is typical for more rubbery surfaces, but the wet test results still come out noisier for Belt B with the higher strikethrough.

Inventive belt Ex. 1 uses the striped fabric shown in FIG. 7, at a similar overall yarn density as Comp. Belt B, but resulting in ribs with stripes of high and low strikethrough, and an average dry COF of 1.54, close to the higher COF desired as in Comp. Belt B. However, the Wet COF of inventive belt Ex. 1 is now higher again, closer to the value of Comp. Belt A. The inventive belt Ex. 1 also runs quietly at the two misalignment test conditions, even though the average COF, either dry or wet, is very similar to that of the noisy Belt B. This confirms the prediction of the model above that striped belts generate less noise than uniform belts of the same average COF.

TABLE 1

| Stripe Pattern[1] | Average COF | Striped Strain Energy | Constant COF Strain Energy | % Reduction in Strain Energy |
|---|---|---|---|---|
| L only | 0.3 | — | 0.23 | — |
| 5H + 10L | 0.4 | 0.28 | 0.32 | −13% |
| 1H + 1L | 0.45 | 0.13 | 0.42 | −69% |
| 2H + 2L | 0.45 | 0.2 | 0.42 | −52% |
| 3H + 3L | 0.45 | 0.26 | 0.42 | −38% |
| 4H + 4L | 0.45 | 0.25 | 0.42 | −40% |
| 5H + 5L | 0.45 | 0.29 | 0.42 | −31% |
| 10H + 10L | 0.45 | 0.26 | 0.42 | −38% |
| 10H + 5L | 0.5 | 0.29 | 0.49 | −41% |
| H only | 0.6 | — | 0.76 | — |

[1]L = Low COF stripe, width in mm; H = high COF stripe, width in mm.

TABLE 2

| Belt No. | Knit Fabric | Relative Yarn Density | Dry COF | Wet COF | 2.0° Misalignment Noise | |
|---|---|---|---|---|---|---|
| | | | | | −20° C. dry | 5° C. 90% RH |
| Comp. A | Std. Jersey Knit; high knit density | standard density | 0.73 | 1.08 | 79 dB | 79 dB |
| Comp. B | Std. Jersey Knit; low knit density | ~30% lower density | 1.59 | 0.95 | 98 | 91 |
| Ex. 1 | Stripes: 5 mm high × 10 mm low density[1] | ~30% lower density | 1.54 | 1.01 | 81 | 80 |

[1]i.e., stripes of 5-mm low COF + 10-mm high COF due to rubber strike-through.

To summarize, the inventors have discovered that belts with fabric stripes of differing yarn density, and different levels of rubber strike-through, can exhibit the favorable aspects of both stripes, i.e., a favorable combination of the properties that would be expected for each type of stripe, without the expected negative aspects of the two types of stripes. Thus, Belt C exhibits the high dry COF expected for a rubbery surface, but also the higher wet COF expected for a fiber surface, but without the noise generation expected on a dry test of a conventional higher COF belt and without the noise expected on a rubbery belt on a wet test.

Additional examples of fabrics and V-ribbed belts are listed in TABLE 3 to show that a wide range of striped fabric constructions are useful for making power transmission belts. Ex. 2 through Ex. 6 illustrate relatively narrow stripes, such as modelled above. The knit construction of Ex. 2 is similar to the illustration of FIG. 6. The knit construction of Ex. 3 is like FIG. 6 but with 3 inactive needles in the dropped stitch sections instead of only 2. The knit of Ex. 4-6 is illustrated in FIG. 8. The knits of Ex. 9-14 are the same as Ex. 1 above. The knits of Ex. 7 and 8 are similar to Ex. 1, but with different widths of stripes, as indicated in TABLE 3.

TABLE 3 also shows how the amount of stretch applied to the fabric when building the belt slab on the mold can affect the rubber strike through as indicated by the COF. As the amount of stretch increases, the fabric density decreases and the fabric becomes more open or permeable to rubber strike-through. As the strike-through permeability increases, the resulting COF of the belt increases. Comparing the noise results for Ex. 9-14, it appears that highly stretched fabric may eventually result in such a high COF that the belt becomes noisy. Comparing Ex. 4 to Ex. 9 suggests that thinner stripes can result in less noise than the thicker stripes, just as the FEA model above predicted.

TABLE 3

| Belt Ex. No. | Striped Knit Fabric | Stretch on mold | Dry COF | Wet COF | 2.0° Misalignment Noise | |
|---|---|---|---|---|---|---|
| | | | | | −20° C. dry | 5° C. 90% RH |
| 2 | 2 plain × 2 ms[1] | 83% | 1.3 | 1.04 | 80 dB | 79 dB |
| 3 | 2 plain × 3 ms | 108% | 1.6 | 1.01 | 81 | 79 |
| 4 | 3 piqué × 2 ms | 142% | 1.78 | 0.92 | 82 | 78 |
| 5 | 3 piqué × 2 ms | 100% | 1.62 | 1.07 | 80 | 79 |
| 6 | 3 piqué × 2 ms | 85% | 1.47 | 1.06 | 78 | 79 |
| 7 | 5 mm × 5 mm[2] | 115% | 1.41 | 1.0 | 79 | 79 |
| 8 | 10 mm × 10 mm | 138% | 1.45 | 1.01 | 79 | 79 |
| 9 | 5 mm × 10 mm | 183% | 1.74 | 0.89 | 87 | 93 |
| 10 | 5 mm × 10 mm | 146% | 1.62 | 0.95 | 81 | 82 |
| 11 | 5 mm × 10 mm | 138% | 1.53 | 0.94 | 80 | 79 |
| 12 | 5 mm × 10 mm | 112% | 1.49 | 0.98 | 80 | 79 |
| 13 | 5 mm × 10 mm | 98% | 1.26 | 1.02 | 79 | 76 |
| 14 | 5 mm × 10 mm | 76% | 1.27 | 1.05 | 79 | 79 |

[1]"ms" = missed-stitch or dropped stitch.
[2]width of each stripe in mm, the high-density stripe width first and the lower-density stripe width given second.

According to second embodiment (or group of embodiments) of the invention, the stripes of different COF are obtained by alternating two different rubber compositions at the belt surface. For example, one composition may include a friction modifier that gives it a lower COF than the other composition. Any suitable process may be used to obtain the stripes. The two rubber compositions may be coextruded or co-calendered to provide a striped sheet of rubber that may then be applied to the belt mold or built up with other belt materials. Alternately, as another example, a first rubber material of a first COF may be sheet-formed and a second rubber material of a second COF may be applied thereon in stripes by a coating process, extrusion process, or by a printing process. The two rubber compositions may be applied in stripes onto a carrier fabric, which may woven, knit or non-woven, and may be included in the belt construction. The stripes of rubber may be applied to a carrier film and transferred to the belt or mold.

Suitable friction modifiers for lowering the COF of a rubber composition include, without limit, fluoropolymers such as TFE, PTFE, FEP and the like, molybdenum compounds, graphitic materials, silicone materials, blooming oils, and the like. The friction modifiers may be in powder, liquid or fiber form. Fibers may be used in either the low COF rubber or the high COF rubber. Cotton or other cellulosic fiber may be particularly useful in one or both of the two rubbers. One of the two rubbers in the stripes could be the same composition as the body of the belt. The belt body may be either the high or low COF rubber with the other rubber composition then added on in a striped pattern.

Stripes may be applied in a spiral pattern onto a belt mold or mandrel. Alternately, a striped pattern may be applied onto a surface of a finished belt by a suitable printing, coating, or extruding process.

The stripes indicated in FIGS. 1-3 could be rubber stripes according to this second embodiment.

According to a third embodiment (or group of embodiments) of the invention, the stripes of different COF may be obtained by alternating a rubber, fabric or rubberized fabric composition with a flocked stripe. "Flocking" refers to applying short fibers to a surface of a belt, and to the resulting surface arrangement of fibers. U.S. Pat. Nos. 6,561,937 and 3,190,137 describe various methods and materials known for producing uniform flocked surfaces and are hereby incorporated herein by reference. Any of the methods disclosed therein could be adapted to generate flocked stripes or stripes of flocking on a belt surface according to the present invention. Depending on the choice of an adhesive, the underlying fabric or rubber surface, i.e., depending on the alternating stripes, and the choice of flock materials, the flocked stripes could have higher or lower COF than the alternating regions. Flocking of a striped pattern on rubber surface may be applied either before or after molding the belt. Any suitable flocking fiber, adhesive, and process for depositing and adhering fibers or flocking on a belt surface may be used. For example, flock could be applied by mechanical methods, windblown methods, electrostatic processes, or combinations thereof. Useful fibers include cellulosics, such as cotton, rayon, flax, kenaf, or the like, synthetics such as nylons, aramids, polyesters, and the like, or carbon, glass, or other inorganic fibers, or combinations thereof.

Figure 14:
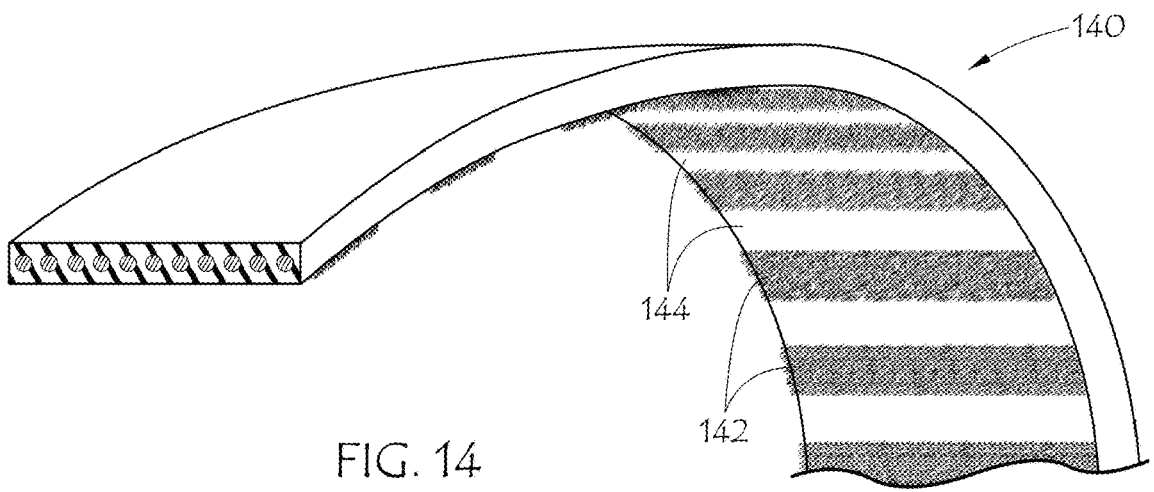
FIG. 14 is a partially fragmented view of a flat belt with striped rib surface according to a third embodiment of the invention.

FIG. 14 shows an exemplary belt 140 with flocked stripes 142 alternating with rubbery stripes 144.

Stripes of different COF could also be introduced on a belt surface by means of 3D or inkjet printing, extrusion, dipping, spraying, frictioning, skimming, or combinations thereof, or other means of creating stripes with two values of COF. This could be done on a sheet of carrier material to then apply to the mold. The carrier material could be removed (a transfer label process), or the carrier material could be included in the belt, in which case the carrier material could be one of the COF materials. Alternately, the stripes could be applied to a belt body directly after molding or before molding. If applied after molding, the belt could have a cut or ground belt profile to which the stripes are applied. The stripes could end up at any desired angle on the belt surface. The materials could be applied as a sheet at a belt-building step or could be spiraled on as a strip at a desired angle.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A power transmission belt comprising a pulley-contact surface comprising stripes defined as two or more alternating regions of different coefficient of friction wherein the stripes are alternating regions of different rubber composition.

2. A power transmission belt comprising a pulley-contact surface comprising stripes defined as two or more alternating regions of different coefficient of friction wherein the stripes include flocked regions alternating with rubber regions.

3. A power transmission belt comprising a pulley-contact surface comprising stripes defined as two or more alternating regions of different coefficient of friction wherein the pulley-contact surface comprises a reinforcing fabric and said stripes correspond to two or more alternating regions of different weave or knit patterns in said fabric; wherein the two or more alternating regions also exhibit different area densities, different porosities, different permeabilities, or different stretch characteristics.

4. A power transmission belt comprising a fabric reinforcement comprising stripes defined as two or more alternating regions of different weave or knit patterns; wherein the two or more alternating regions also exhibit different area densities.

5. The power transmission belt of claim 4 wherein the two or more alternating regions are disposed on a pulley contact surface of the power transmission belt and exhibit different coefficients of friction against a corresponding pulley surface.

6. The power transmission belt of claim 4 wherein the two or more alternating regions on the contact surface exhibit different levels of rubber strikethrough.

7. The power transmission belt of claim 4 wherein the stripe of lower area density comprises floats.

8. The power transmission belt of claim 4 wherein the fabric is knit and one of the different knit patterns comprises one or more wales of dropped stitches.

9. The power transmission belt of claim 4 wherein the fabric is woven and one of the different weave patterns comprises one or more missing warp or weft yarns.

10. The power transmission belt of claim 4 in the form of a V-ribbed belt comprising a plurality of ribs with the fabric disposed on the ribs.

11. A woven or knit fabric for reinforcing a power transmission belt comprising stripes defined as two or more alternating regions of different weave or knit patterns; wherein the two or more alternating regions also exhibit different area densities.

12. The fabric of claim 11 wherein the fabric is knit and one of the different knit patterns comprises one or more wales of dropped stitches.

13. The fabric of claim 11 wherein the fabric is woven and one of the different weave patterns comprises one or more missing warp or weft yarns.

14. The fabric of claim 11 wherein the stripe of lower area density comprises floats.

* * * * *